United States Patent
Segal et al.

(10) Patent No.: US 12,249,061 B1
(45) Date of Patent: Mar. 11, 2025

(54) DETECTION AND ESTIMATION OF DEFECTS IN VEHICLE'S EXTERIOR

(71) Applicant: UVeye Ltd., Tel Aviv (IL)

(72) Inventors: Dan Segal, Ra'anana (IL); Gideon Carmon, Arad (IL); Ron Shmuel Sudar, Netanya (IL); Paz Ilan, Tel Aviv (IL)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 18/628,731

(22) Filed: Apr. 7, 2024

(51) Int. Cl.
| | |
|---|---|
| G06T 7/00 | (2017.01) |
| G06T 7/30 | (2017.01) |
| G06T 7/62 | (2017.01) |
| G06T 15/00 | (2011.01) |
| G06V 10/44 | (2022.01) |

(52) U.S. Cl.
CPC ............... *G06T 7/001* (2013.01); *G06T 7/30* (2017.01); *G06T 7/62* (2017.01); *G06T 15/00* (2013.01); *G06V 10/44* (2022.01); *G06T 2207/30156* (2013.01)

(58) Field of Classification Search
CPC .. G06T 7/001; G06T 7/30; G06T 7/62; G06T 15/00; G06T 2207/30156; G06V 10/44
See application file for complete search history.

(56) References Cited

U.S. PATENT DOCUMENTS

| | | | |
|---|---|---|---|
| 11,915,479 B1 * | 2/2024 | Lavie | G06N 3/08 |
| 2021/0170960 A1 * | 6/2021 | Gould | B60R 25/1004 |
| 2022/0358775 A1 * | 11/2022 | Hantehzadeh | G06T 7/11 |

* cited by examiner

*Primary Examiner* — Jon Chang

(57) ABSTRACT

A method of estimating dimensions of vehicle's exterior defects based on reference dimensions comprising analyzing one or more images captured by one or more image sensors deployed to depict a vehicle to identify one or more reference feature relating to the vehicle, obtaining real-world size of the reference feature(s), computing a pixel to real-world size ratio for the image sensor(s) based on the real-world size of the reference feature(s) and a size in pixels of the reference feature(s) in the image(s), analyzing one or more images captured by the image sensor(s) to identify one or more defects in an exterior of the vehicle, computing a size in pixels of one or more dimensions of each defect; and computing a real-world size of the dimension(s) based on the size in pixels of the respective dimension and the pixel to real-world size ratio.

16 Claims, 9 Drawing Sheets

DETECTION AND ESTIMATION OF DEFECTS IN VEHICLE'S EXTERIOR

FIELD AND BACKGROUND OF THE INVENTION

The present invention, in some embodiments thereof, relates to estimating dimensions of defects detected in vehicles' exterior, and, more specifically, but not exclusively, to estimating dimensions of defects detected in vehicles' exterior based on depth data and/or based on known dimensions of reference features of the vehicles.

Evaluating condition of vehicles may be desirable and beneficial for a plurality of applications, for example, vehicles cost estimation, vehicles maintenance, vehicle fleets monitoring and/or management, tear and wear evaluation, and/or the like.

Such vehicles evaluation may include among other assessments, estimation of the condition of the vehicles exterior, specifically side, top, front and/or rear exterior surfaces of the vehicles, for example, doors, windows, fenders, side skirts, roof, engine hood, trunk lid, windshield, and/or the like.

SUMMARY OF THE INVENTION

According to a first aspect of the present invention there is provided a method of estimating dimensions of vehicle's exterior defects based on reference dimensions, comprising using one or more processors for:
  Analyzing one or more images captured by one or more image sensors deployed to depict one or more vehicles to identify one or more reference features relating to the one or more vehicles.
  Obtaining a real-world size of the one or more reference feature.
  Computing a pixel to real-world size ratio for the one or more image sensors based on the real-world size of the one or more reference features and a size in pixels of the one or more reference features in the one or more image.
  Analyzing one or more images captured by the one or more image sensors to identify one or more defects in an exterior of the one or more vehicles.
  Computing a size in pixels of one or more dimensions of the one or more defects.
  Computing a real-world size of the one or more dimensions based on the size in pixels of the one or more dimensions and the pixel to real-world size ratio.

According to a second aspect of the present invention there is provided a system for estimating dimensions of vehicle's exterior defects based on reference dimensions, comprising one or more processors configured to execute a code. The code comprising:
  Code instructors to analyze one or more images captured by one or more image sensors deployed to depict one or more vehicles to identify one or more reference features relating to the one or more vehicles.
  Code instructors to obtain a real-world size of the one or more reference features.
  Code instructors to compute a pixel to real-world size ratio for the one or more image sensors based on the real-world size of the one or more reference features and a size in pixels of the one or more reference features in the one or more images.
  Code instructors to analyze one or more image captured by the one or more image sensors to identify one or more defects in an exterior of the one or more vehicles.
  Code instructors to compute a size in pixels of one or more dimensions of the one or more defects.
  Code instructors to compute a real-world size of the one or more dimensions based on the size in pixels of the one or more dimensions and the pixel to real-world size ratio.

In a further implementation form of the first, and/or second aspects, the one or more defects are members of a group consisting of: a dent, a bent, a hole, a tear, a scratch, and/or a de-coloration.

In a further implementation form of the first, and/or second aspects, the one or more dimensions of the one or more defects are members of a group consisting of: length, width, depth, height, diameter, border, and/or outline.

In a further implementation form of the first, and/or second aspects, the one or more reference features comprise one or more physical reference features of the one or more vehicles.

In a further implementation form of the first, and/or second aspects, the one or more physical references comprises one or more wheel features of one or more of the wheels of the one or more vehicles. The one or more wheel features are members of a group consisting of: a wheel rim size (diameter), and/or a tire aspect ratio (profile).

In a further implementation form of the first, and/or second aspects, the real-world size of the one or more wheel features is determined according to tire dimensions marked on one or more tires of the one or more vehicles. The marked tire dimensions are identified by analyzing one or more images depicting one or more of the tires of the one or more vehicles.

In a further implementation form of the first, and/or second aspects, the real-world size of the one or more physical reference features is obtained from one or more databases according to a model of the one or more vehicles.

In a further implementation form of the first, and/or second aspects, the model of the one or more vehicles is identified based on a model identifier detected in the one or more images.

In a further implementation form of the first, and/or second aspects, the one or more references feature comprise one or more projected reference features of one or more patterns projected on the one or more vehicles by one or more light sources.

In a further implementation form of the first, and/or second aspects, the real-world size of the one or more projected reference features is derived from one or more of: calibration of the one or more light sources with respect to the one or more image sensors, empiric mapping of size in pixels of the one or more projected reference features to corresponding real-world sizes of the one or more projected reference features at a plurality of distances, and/or one or more operational parameters of the one or more image sensors.

In a further implementation form of the first, and/or second aspects, the real-world size of the one or more dimensions of the one or more defects is computed based on a distance between the one or more image sensors and the one or more vehicles. The distance is derived from the real-world size of the one or more reference features and the size in pixels of the one or more reference features in the one or more images.

In a further implementation form of the first, and/or second aspects, the one or more image sensors are deployed along a predefined passage track defined for the one or more vehicle to follow such that the lens plane of the one or more image sensors is parallel to the predefined passage track.

In an optional implementation form of the first, and/or second aspects, the pixel to real-world size ratio is adjusted according to deviation of the one or more vehicle from the predefined passage track.

In a further implementation form of the first, and/or second aspects, the deviation is detected based on analysis of the one or more reference features identified in a plurality of images captured by a plurality of image sensors distributed along the predefined passage track.

In an optional implementation form of the first, and/or second aspects, a plurality of images are received which are captured by a plurality of image sensors deployed to depict a right side, a left side, and a top side of the one or more vehicle such that the right side, the left side, and the top side are scanned simultaneously.

In an optional implementation form of the first, and/or second aspects, the pixel to real-world size ratio is adjusted according to one or more operational parameters of the one or more image sensors.

According to a third aspect of the present invention there is provided a method of estimating dimensions of vehicle's exterior defects based on depth data, comprising using one or more processors for:

Receiving one or more images captured by one or more image sensors deployed to depict one or more vehicles.

Receiving one or more 3 dimensional (3D) images captured by one or more depth sensors deployed to depict the one or more vehicles.

Registering the one or more 3D images to the one or more images.

Analyzing the one or more images to identify one or more defects in an exterior of the one or more vehicles.

Extracting from the one or more 3D images a distance to the one or more defects.

Computing a real-world size of one or more dimensions of the one or more defects based on the size in pixels of the one or more dimensions and the distance.

According to a fourth aspect of the present invention there is provided a system for estimating dimensions of vehicle's exterior defects based on depth data, comprising one or more processor configured to execute a code. The code comprising:

Code instructors to receive one or more images captured by one or more image sensors deployed to depict one or more vehicles.

Code instructors to receive one or more dimensional (3D) images captured by one or more depth sensors deployed to depict the one or more vehicles.

Code instructors to register the one or more 3D images to the one or more images.

Code instructors to analyze the one or more images to identify one or more defects in an exterior of the one or more vehicles.

Code instructors to extract from the one or more 3D images a distance to the one or more defects.

Code instructors to compute a real-world size of one or more dimensions of the one or more defects based on the size in pixels of the one or more dimensions and the distance.

In a further implementation form of the third, and/or fourth aspects, the one or more depth sensors are deployed to depict the one or more vehicles from a distance similar to the distance of the one or more vehicles from the one or more image sensors.

In an optional implementation form of the third, and/or fourth aspects, the one or more image sensor and the one or more depth sensor are deployed such that a view angle of the one or more depth sensor with respect to the one or more vehicle is similar to the view angle of the one or more vehicle from the one or more image sensor.

In an optional implementation form of the third, and/or fourth aspects, a plurality of images and a plurality of corresponding 3D images are received which are captured by a plurality of image sensors and a plurality of corresponding depth sensors deployed to depict a right side, a left side, and a top side of the one or more vehicles such that the right side, the left side, and the top side are scanned during a single pass of the one or more vehicles.

In a further implementation form of the third, and/or fourth aspects, the one or more defect is a member of a group consisting of: a dent, a hole, a tear, a scratch, and a de-coloration, wherein the one or more dimension of the one or more defect is a member of a group consisting of: length, width, depth, diameter, and/or border.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
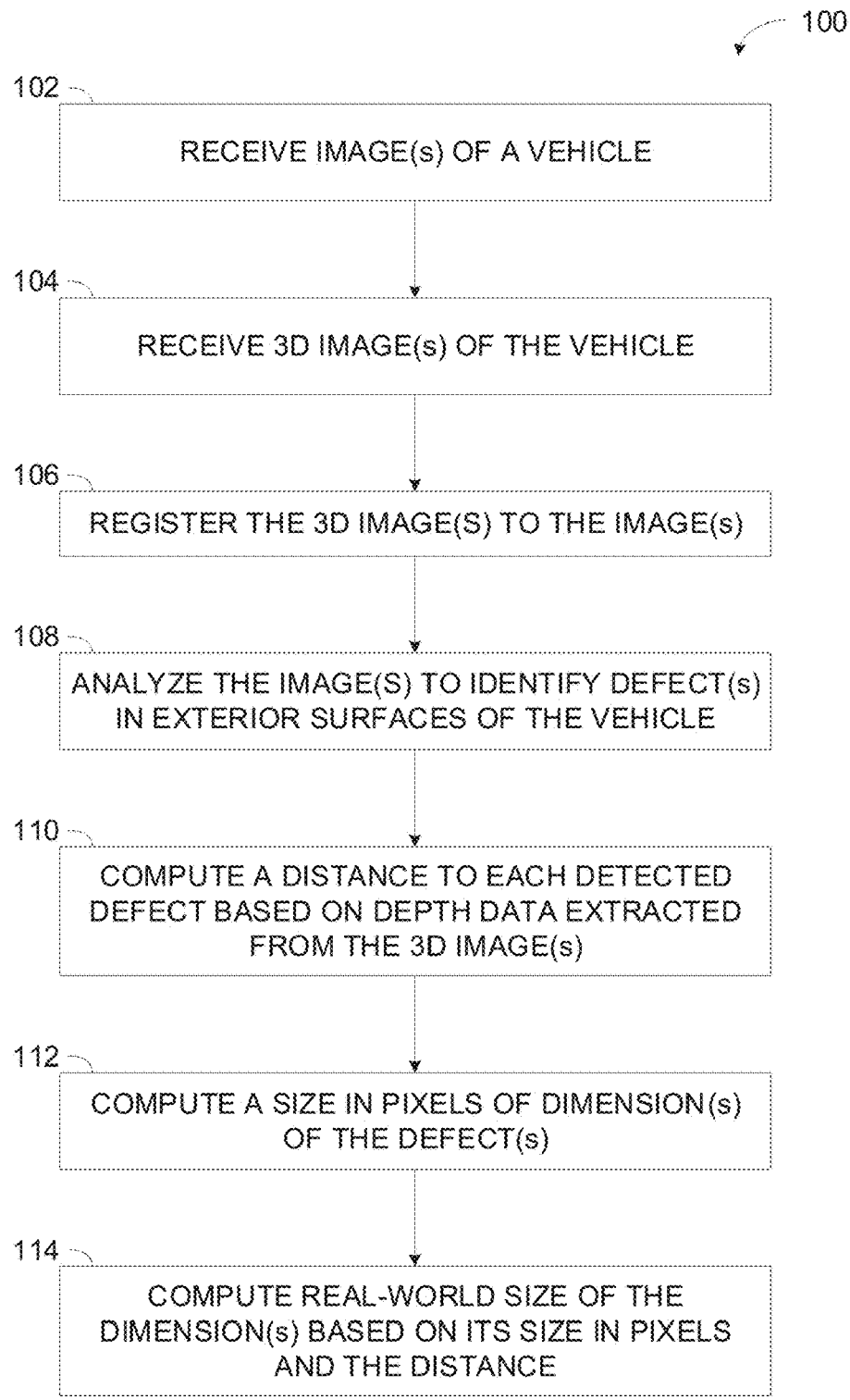
FIG. 1 is a flowchart of an exemplary process of estimating dimensions of defects detected in vehicles' exterior based on depth data, according to some embodiments of the present invention.

The present invention, in some embodiments thereof, relates to estimating dimensions of defects detected in vehicles' exterior, and, more specifically, but not exclusively, to estimating dimensions of defects detected in vehicles' exterior based on depth data and/or based on known dimensions of reference features of the vehicles.

Detecting defects in vehicles exterior may be highly valuable for a plurality of applications directed to assess vehicles condition, specifically conditions of side, top, front and/or rear exterior of the vehicles, for example, doors, windows, fenders, side skirts, roof, engine hood, trunk lid, windshield, and/or the like for one or more purposes, for example, vehicles cost estimation, vehicles maintenance, vehicle fleets monitoring and/or management, tear and wear evaluation, and/or the like.

However detecting defects in vehicles exterior, for example, dents, bents, holes, tears, scratches, de-coloration, and/or the like may be highly challenging due to the extensive exterior surfaces of each vehicles and even more due to the vast number of vehicles which may need to be scanned for defects to evaluate their conditions.

According to some embodiments of the present invention, there are provided methods, systems, devices and computer software programs for effectively detecting defects in vehicles exterior and efficiently estimating dimensions, for example, length, width, depth, height, border, outline, and/or the like of the identified defects.

In particular, the defects in exterior surfaces of vehicles may be identified and estimated based on visual inspection of images of the vehicles exterior which are captured by image sensors, for example, a camera, a video camera, an Infrared sensor, and/or the like statically deployed to scan the vehicles while the vehicles are located, and more specifically, while the vehicles pass in front of the sensors.

Moreover, a plurality of image sensors may be deployed to simultaneously scan the passing vehicles from multiple sides, specifically from their right, left and/or top sides thus supporting identification of defects in each vehicle exterior on multiple sides of the vehicles during a single pass of the respective vehicle in front of the sensors.

This scanning scheme may allow fast and efficient scan of the vehicle on all its sides and may be highly scalable as a plurality of vehicles may be driven in front of the sensors thus allowing high performance defects detection and estimation, for example, accuracy, reliability, robustness and/or the like. Moreover, this scheme may be highly scalable since each vehicle may be effectively scanned a significantly short scan time thus allowing for a plurality of vehicles to be driven in front of the sensors one after another at significantly high speed. Furthermore, by taking advantage of the mobility of the vehicles, the image sensors may be statically deployed at fixed locations, which may allow effective scan of each vehicle with a significantly reduced number of image sensors thus reducing costs and/or effort, for example, sensor hardware costs, deployment complexity and/or effort, scanning complexity and/or effort, and/or the like.

However, due to the fact that the vehicles move in front of the image sensors, the distance between the vehicles and the sensors may not be predefined and thus prevent accurate estimation and/or computation of physical dimensions of defects identified in the images captured by the image sensors since the size of objects in the images depends on the distance of the objects from the image sensors.

According to some embodiments of the present invention, each image sensor deployed to scan exterior surfaces of the vehicles may be associated and paired with a respective depth sensor adapted to capture three dimensional (3D) images of the vehicles. Specifically, each pair of sensors, i.e., an image sensor and an associated depth sensor, may be deployed at the same distance from the vehicles located and/or passing in front of the sensors.

While a respective image sensor captures one or more images (2D images) of the vehicle located and/or passing in front of it, the depth sensor associated with the respective image sensor may capture one or more 3D images.

After registering the 2D image(s) with corresponding 3D image(s), the location (e.g., area, region) of each defect identified in the 2D image may be identified in the register 3D image and the distance to the defect location may be extracted from the 3D image(s). Since the depth sensor and the image sensor of each pair of sensors are located at the same distance from the vehicle, the distance extracted from the 3D image(s) captured by the depth sensor is also the distance of the image sensor from the vehicle.

Real-world size of one or more dimensions of each identified defect may be then computed based on the size in pixels of the respective dimension in the 2D image(s) and the distance of the image sensor from the vehicle, i.e., from the defect in the vehicle's exterior surface.

Using depth sensors to determine an accurate distance of the image sensor(s) from the vehicle may significantly increase defects estimation performance, for example, accuracy, reliability, consistent, robustness, and/or the like since dimensions of the defects may be accurately computed based on the accurate distance to the target, i.e., to the vehicle's exterior surface.

Moreover, scanning the vehicles using depth and image sensors may be highly efficient and fast thus significantly reducing scan time which may significantly expedite the defects detection and estimation process. Scan speed and efficiency may be further increased by simultaneously scanning the vehicles from all sides during a single pass of each vehicle in front of the sensors.

According to some embodiments of the present disclosure, the real-world size of one or more dimensions of defects identified in exterior surfaces of vehicles may be estimated and/or computed based on known dimensions of one or more reference features identified in images of the vehicles. In particular, the real-world size of the defects' dimensions may be computed based on known real-world dimension values of the reference features.

The reference features may include and/or relate, for example, to one or more physical features and/or elements of the vehicles, for example, wheels, doors, windows, windshield, fenders, roof, engine hood, trunk lid, and/or the like for which the values of one or more of the their dimension (e.g., length, width, height, diameter, etc.) are known. Moreover, the selected reference features may include such features which are clearly visible in the image(s).

In another example, the reference features may comprise one or more projected features of one or more (light) patterns projected on the vehicles by one or more light sources deployed to illuminate the vehicles while scanned by the image sensor(s).

One or more images of the vehicle may be analyzed to identify one or more of the reference features. Moreover, a size in pixels may be computed for the identified reference feature(s) based on analysis of the image(s).

Real-world size of the identified reference feature(s) may be them obtained. For example, the physical reference features may include one or more wheel features of the vehicle, for example, a wheel rim size, a tire aspect ratio (profile), and/or the like having real-world size marked on the vehicle's tires and may be thus obtained by analyzing image(s) depicting the vehicle's tire(s). In another example, the real-world size of one or more physical reference features may be obtained from one or more databases according to a model of the scanned vehicle. In another example, the real-world size of one or more projected reference features may be determined using one or more methods, for example, calibration in which size in pixels of projected features may be correlated to real-world size, empiric mapping (via testing) of size in pixels to real-world sizes of projected reference features at various distances, based on operational parameters of the images sensor(s), and/or the like.

The size in pixels and the real-world size of one or more of the reference feature(s) identified in the image(s) may be then used to compute a pixel to real-world size ratio which may express a ratio between the size of each pixel in the image(s) and a corresponding real-world size.

Using the computed pixel to real-world size ratio, the real-world size of one or more dimensions of one or more defects identified in image(s) depicting exterior surface(s) of the vehicle may be computed according to the size in pixels of the respective dimension in the image(s).

Estimating defects in vehicles exterior based on known real-world size of reference features of the vehicles may allow for significantly high defects estimation performance while significantly reducing costs, effort and/or complexity (deployment, maintenance, operational, etc.), and/or effort, and/or the like since only simple low cost image sensors may be needed for scanning the vehicles.

Moreover, scanning the vehicles using image sensors may be highly efficient and fast thus significantly reducing scan time which may significantly expedite the defects detection and estimation process. Scan speed and efficiency may be further increased by simultaneously scanning the vehicles from all sides during a single pass of each vehicle in front of the sensors.

Furthermore, using physical reference features whose real-world size is immediately available, for example, wheel features may significantly reduce scan time and/or computing resources since there is no need to fetch data from remote sources, and/or store large data repositories for fetching real-world size of physical reference features detected in the images.

In addition, detecting and estimating the defects based on projected reference features may significantly increase defects estimation accuracy and/or reliability since the projected reference features may be used to establish a highly accurate conversion of size in pixels to real-world size of detected defects.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of estimating dimensions of defects detected in vehicles' exterior based on depth data, according to some embodiments of the present invention.

An exemplary process 100 may be executed to estimate dimensions of defects detected in exterior surfaces of one or more vehicles, specifically side, top, front and/or rear exterior surfaces, for example, a door, a window, a front fender, a back fender, a roof, an engine hood, a trunk lid, a windshield, and/or the like. In particular, the defects' dimensions may be estimated based on visual inspection coupled with depth data captured for the vehicle's exterior.

One or more image sensors may be deployed and adapted to capture one or more images of a vehicle while located and/or passing in front of the image sensors. In addition, one or more depth sensors may be also deployed to capture depth data of the vehicle while located and/or passing in front of the depth sensors.

In particular, the image sensor(s) and the depth sensor(s) may be deployed in pairs each associating an image sensor and a depth sensor such that the distance between the passing vehicle and the sensors of the respective pair is significantly similar, i.e., the distance between the passing vehicle and the depth sensor is the same as the distance between the passing vehicle and the associated image sensor. Moreover, the associated depth and image sensors may be deployed to have a similar view angle of the passing vehicle.

One or more images (2D images) of the vehicle captured by the image sensor(s) may be registered with corresponding 3D images captured by the associated depth sensor(s).

The image(s) of the vehicle may be analyzed to detect one or more defects in the exterior surfaces of the vehicle. The distance of the image sensor to the detected defects may be computed based on a 3D point cloud extracted from the corresponding 3D image(s).

One or more dimensions of each detected defect, for example, length, width, depth, diameter, border line, and/or the like may be then computed based on the dimensions' size in pixels and the distance of the image sensor to the vehicle computed based on the 3D image(s).

Figure 2:
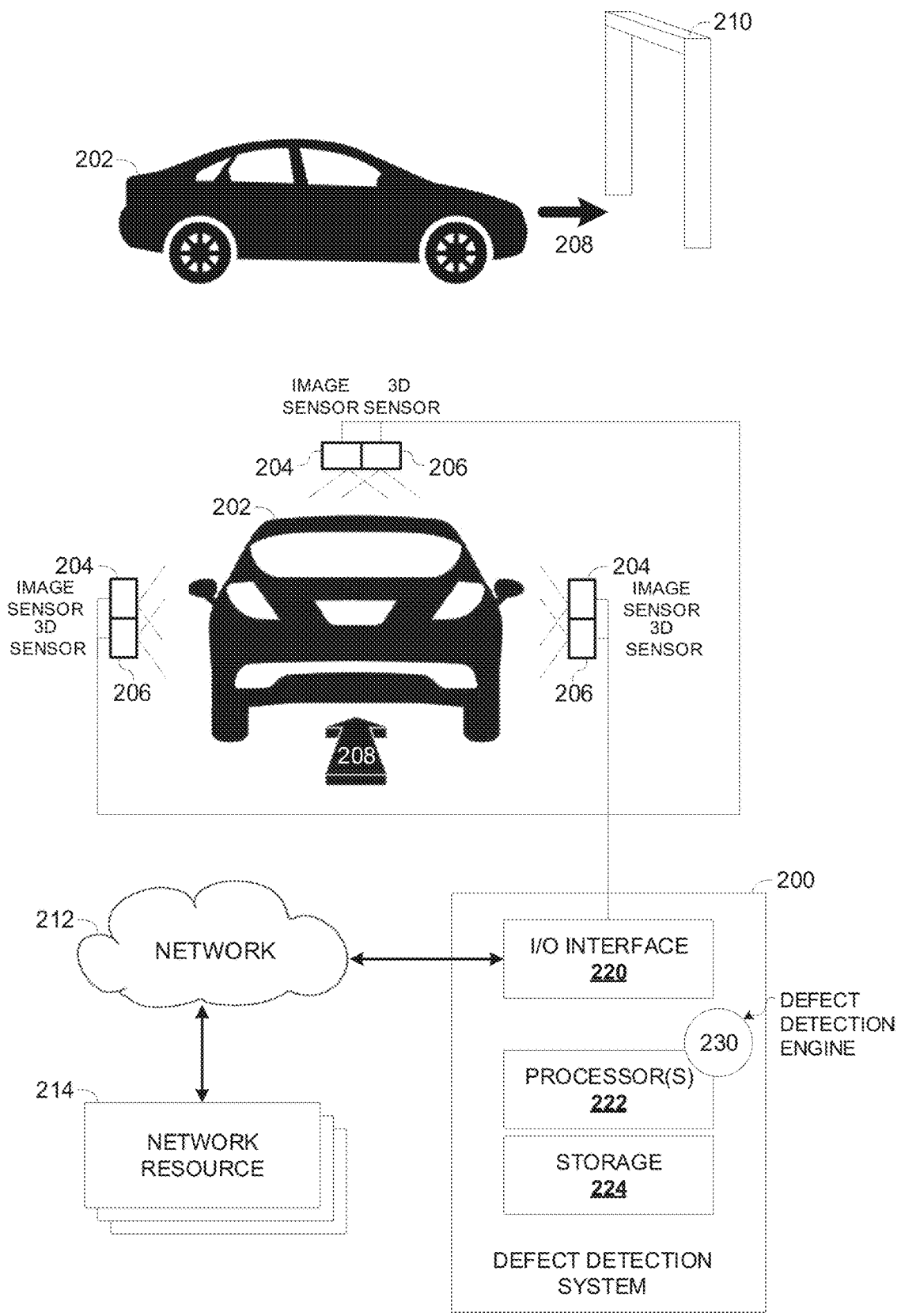
FIG. 2 is a schematic illustration of an exemplary system for estimating dimensions of defects detected in vehicles' exterior based on depth data, according to some embodiments of the present invention.

Reference is also made to FIG. 2, which is a schematic illustration of an exemplary system for estimating dimensions of defects detected in vehicles' exterior based on depth data, according to some embodiments of the present invention.

An exemplary defect detection system 200 may be adapted to detect defects in one or more vehicles 202, for example, a car, a truck, a bus, and/or the like. Specifically the defect detection system 200 may be adapted to detect defects in exterior surfaces of the vehicle(s) 202, for example, a door, a window, a front fender, a back fender, a roof, an engine hood, a trunk lid, a windshield, and/or the like and estimate dimensions of the detected defects.

One or more image sensors 204, for example, a camera, a video camera, an infrared camera, and/or the like may be deployed to capture one or more images of the vehicle 202 while located and/or passing in front of the image sensors 204. Specifically, the image sensor(s) 204 may be deployed to capture images of the exterior surfaces of the vehicle 202. As such, the image sensor(s) 204 may be deployed to monitor a right side of the vehicle 202, a left side of the vehicle 202, and/or a top side of the vehicle 202.

One or more depth sensors 206, for example, a stereoscopic camera, and/or the like may be deployed to capture one or more 3D images of the vehicle 202 while located and/or passing in front of the depth sensors 206.

Typically, the image sensor(s) 204 and the depth sensor(s) 206 may be statically deployed, i.e., deployed in a fixed location such that the vehicles 202 may be driven in front of the sensors.

Moreover, the depth sensor(s) 206 and the image sensor(s) 204 may be deployed in pairs each associating a respective image sensor 204 and a respective depth sensor 206. In particular, the image sensor 204 and the depth sensor 206 of each pair may be deployed next to each other such that the distance of the image sensor 204 to the vehicle 202 is the same as the distance of the associated depth sensor 206 to the vehicle 202.

Moreover, the image sensor 204 and the depth sensor 206 of each pair may be optionally deployed such that the vehicle 202 may be viewed by both the depth sensor 206 and the image sensor 204 of the respective pair from a similar view angle, i.e., the vehicle 202 may be viewed by the depth sensor 206 from a view angle that is similar to the view angle from which the vehicle 202 is viewed by the image sensor 204.

Optionally, the image sensor(s) 204 and the depth sensor(s) 206 may be deployed to effectively capture images of the exterior surfaces at multiple sides of the vehicle 202 during a single pass of the vehicle 202 following the passage track 208, for example, exterior surfaces of the right side, the left side, and/or the top side of the vehicle 202. Since the vehicle 202 may be scanned while passing in front of the sensors along the passage track 208, a reduced number of sensors, both image sensors 204 and depth sensors 206, may be used to effectively scan the passing vehicle 202.

Optionally, the image sensor(s) 204 and the depth sensor(s) 206 may be arranged, mounted, coupled, and/or otherwise installed in a scanning structure 210, for example, a gate, an arch, a construction, a pole, a rail, a chamber, and/or the like through which the vehicle 202 may pass according to a predefined passage track 208 and be scanned by the image sensor(s) 204 and the depth sensor(s) 206 from multiple sides, for example, right, left, and/or top sides simultaneously. The term simultaneously as used herein does not necessarily indicate that multiple images sensors 204 deployed at multiple sides of the vehicle 202 capture images of the vehicle 202 at the exact same time, but rather at the same phase or time period while the vehicle 202 is located and/or passing in front of the image sensors 204.

The defect detection system 200, for example, a server, a computer, a computing node, a cluster of computing nodes and/or the like may include an Input/Output (I/O) interface 220, a processor(s) 222, and a storage 224 for storing data and/or program code (program store).

The I/O interface 220 may include one or more wired and/or wireless I/O interfaces, ports and/or interconnections, for example, a Universal Serial Bus (USB) port, a serial port, a Bluetooth (BT) interface, a Radio Frequency (RF) interface, Wireless Local Area Network (WLAN, e.g. Wi-Fi), and/or the like.

Via the I/O interface 220, the defect detection system 200 may communicate, for example, with one or more of the image sensors 204 to receive the images of the exterior surfaces of the vehicle 202 captured by the image sensor(s) 204. In another example, via the I/O interface, the defect detection system 200 may communicate with one or more of the depth sensors 206 to receive the 3D images of the exterior surfaces of the vehicle 202 captured by the depth sensor(s) 206.

In another example, the I/O interface 220 may include one or more wired and/or wireless network interfaces, ports, and/or links, implemented in hardware, software, and/or combination thereof, for connecting to a network 212 comprising one or more wired and/or wireless networks, for example, a Local Area Network (LAN), a Wireless LAN (WLAN, e.g., Wi-Fi), a Wide Area Network (WAN), a Municipal Area Network (MAN), a cellular network, the internet, and/or the like.

Over the network 212, the defect detection system 200 may communicate with one or more remote network resources 214, for example, a remote server, a cloud service, a database, and/or the like. In another example, assuming one or more of the image sensor(s) 204 and/or depth sensor(s) 206 support wired and/or wireless network connectivity and connect to one or more networks of the network 212, the defect detection system 200 may communicate with such image sensor(s) 204 and/or depth senor(s) 206 via the network 212.

The processor(s) 222, homogenous or heterogeneous, may include one or more processing nodes arranged for parallel processing, as clusters and/or as one or more multi core processor(s).

The storage 224 may include one or more non-transitory memory devices, for example, persistent devices such as, for example, a ROM, a Flash array, a hard drive, an SSD, a magnetic disk and/or the like, and/or volatile devices such as, for example, a RAM device, a cache memory and/or the like. The storage 224 may further comprise one or more local and/or remote network storage resources, for example, a storage server, a Network Attached Storage (NAS), a network drive, a cloud storage service and/or the like accessible via the I/O interface 220.

The processor(s) 222 may execute one or more software modules, for example, a process, a script, an application, an agent, a utility, a tool, an Operating System (OS), a service, a plug-in, an add-on, and/or the like each comprising a plurality of program instructions stored in a non-transitory medium (program store) such as the storage 224 and executed by one or more processors such as the processor(s) 222.

Optionally, the processor(s) 222 further include, utilize and/or apply one or more hardware elements available to the defect detection system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator, and/or the like.

The processor(s) 222 may therefore execute one or more functional modules utilized by one or more software modules, one or more of the hardware modules and/or a combination thereof. For example, the processor(s) 222 may execute a defect detection engine 230 functional module adapted for executing the process 100 to detect defects in vehicle's exterior and estimate their dimensions.

Optionally, the defect detection system 200, specifically, the defect detection engine 230 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud Platform (GCP), Microsoft Azure, Amazon Web Service (AWS) and Elastic Compute Cloud (EC2), IBM Cloud, and/or the like.

For brevity, the process 100 is described for detecting defects and estimating their dimensions in a single vehicle 202. This, however, should not be construed as limiting since as may become apparent to a person skilled in the art, the process 100 may be easily, repeated, duplicated, and/or scaled for detecting defects and estimating their dimensions in a plurality of vehicles 202.

As shown at 102, the process 100 starts with the defect detection engine 230 receiving one or more images of the vehicle 202, specifically one or more images of the exterior of the vehicle 202 captured by one or more image sensors 204 while the vehicle 202 is located and/or passes in front of the image sensor(s) 204.

The received image(s) may comprise 2D images which visualize the vehicle 202, in particular the exterior surface(s) of the vehicle 202.

As shown at 104, the defect detection engine 230 may receive one or more 3D images of the vehicle 202 captured by one or more depth sensors 206 while the vehicle 202 is located and/or passes in front of the image sensor(s) 204.

In particular, the received image(s) and 3D image(s) may be captured by one or more associated pairs of image sensors 204 and depth sensors 206. This means, that each image captured by a respective image sensor 204 may be associated with a respective 3D image captured by the depth sensor 206 associated with the respective image sensor 204 at substantially the same time, for example, during the same pass of the vehicle 202 in front of the pair of the respective image sensor 204 and its associated depth sensor 206.

As known in the art, each 3D image may include depth data relating to one or more features depicted in the 3D image, for example, a distance to the respective feature, coordinates of the respective feature, a spatial location of the respective feature, and/or the like.

Figure 3:
FIG. 3 presents an image of an exterior section of a vehicle and a corresponding depth map used for estimating dimensions of defects detected in the vehicles' exterior, according to some embodiments of the present invention.
Figure 3:
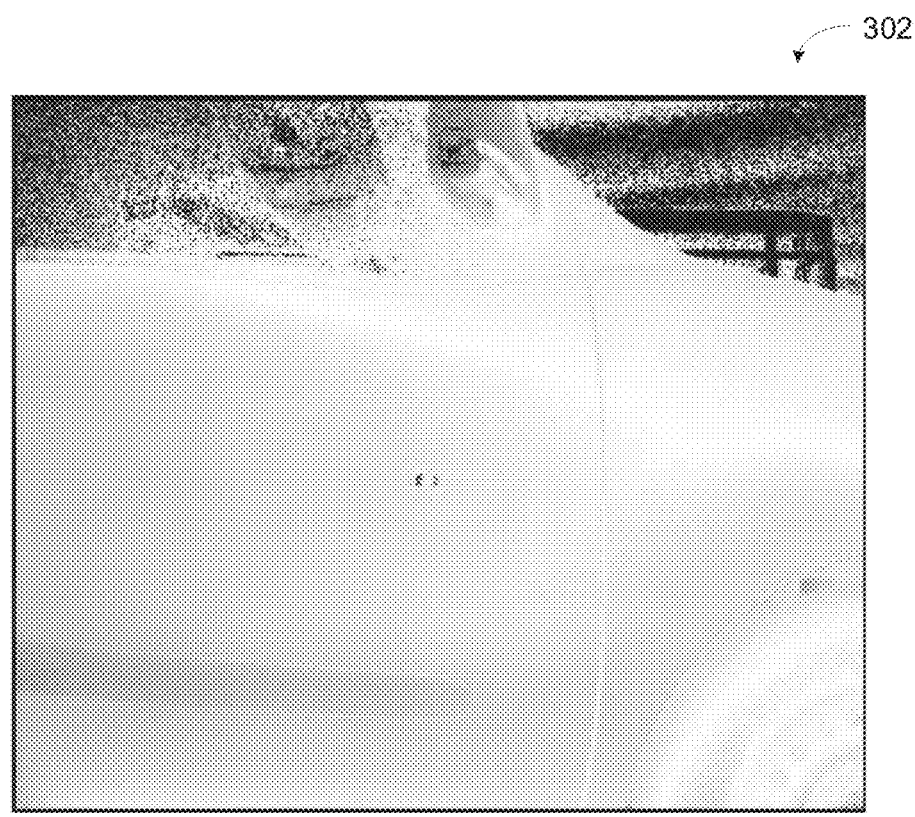

Reference is now made to FIG. 3, which presents an image of an exterior section of a vehicle and a corresponding depth map used for estimating dimensions of defects detected in the vehicles' exterior, according to some embodiments of the present invention.

An image 300 may be captured by an image sensor such as the image sensor 204 depict an exterior section of an exterior surface of an exemplary vehicle such as the vehicle 202 while scanned to detect one or more defects in the exterior surface.

A 3D image 302 may be captured by a depth sensor such as the depth sensor 206 associated with the image sensor 204 which captured the image 300 at the same time of capturing the image 300 such that the 3D image 302 may depict substantially the same exterior section of the vehicle 202 as the image 300.

As seen, distance to points at the exterior section of the vehicle 202 may be expressed through a color map where each color expresses a respective distance value.

Reference is made once again to FIG. 1.

As shown at 106, the defect detection engine 230 may register each image with its respective 3D image.

The defect detection engine 230 may apply one or more registration methods, techniques and/or algorithms for registering each received image with its associated 3D image. For example, the defect detection engine 230 may register the images according to one or more common features of the vehicle 202, specifically common visual features which are detected in both the images and in the 3D images. In another example, the defect detection engine 230 may register the images according to one or more reference visual features located in the scanning site, for example, a pole, a rail, a 3D mark, and/or the like detected in both the images and in the 3D images. It should be noted, however, that image registration is known in the art and its details are out of scope of the present disclosure.

In order to achieve high quality registration between the 2D and 3D images and/or to cover substantially overlapping sections of the exterior surfaces of the vehicle 202 by the 2D and 3D images, the associated pair(s) of image sensor 204 and depth sensor 206 may be deployed to have substantially the same view angle (viewpoint) of the vehicle 202 as described herein before.

As shown at 108, the defect detection engine 230 may analyze the 2D image(s) comprising visual data of the exterior surface(s) of the vehicle 202 to identify one or more defects in the exterior surface(s), for example, a dent, a bent, a hole, a tear, a scratch, a de-coloration, and/or the like.

The defect detection engine 230 may identify the defects in the exterior of the vehicle 202 using one or more visual analysis tools, methods, and/or algorithms as known in the art, for example, computer vision, image processing, classification, and/or the like.

As described herein before, a plurality of image sensors 204, each paired and associated with a respective depth sensor 206, may be deployed around the vehicle 202 to simultaneously capture images of multiple sides of the vehicle 202, for example, right side, left side, and/or top side during a time period while the vehicle is located and/or passing in front of the sensors. Analyzing images and corresponding 3D images depicting multiple sides of the vehicle 202, the defect detection engine 230 may therefore identify defects in exterior surfaces on multiple sides of the vehicle 202 during a single pass of the vehicle 202 in front of the sensors, for example, a single pass along the passage track 208.

As shown at 110, the defect detection engine 230 may compute a distance to each detected defect based on depth data extracted from the 3D image(s).

In particular, since the 3D image(s) is registered with the 2D image(s), the defect detection engine 230 may identify the exact location (area, region, etc.) of the defect in the 3D image(s) according to its location in the 2D image(s).

Using the depth data relating to the location of the defect(s) in the corresponding 3D image(s), the defect detection engine 230 may therefore compute the distance between the depth sensor 306 and each detected defect.

The defect detection engine 230 may apply one or more methods, techniques and/or algorithms to compute the distance to the detected defect(s). For example, assuming the depth data extracted from the 3D image(s) comprises coordinates data of each point mapped in the 3D image(s). In such case, based on the coordinates data, the defect detection engine 230 may create a 3D point cloud mapping one or more exterior surfaces of the vehicle 202 captured in the 3D image(s). The defect detection engine 230 may then compute the distance to the locations mapping the identified defects based on the 3D point cloud. In another example, assuming the depth data extracted from the 3D image(s) comprises distance to each point mapped in the 3D image(s), the defect detection engine 230 may derive the distance to the points mapping the defect(s) in the 3D image(s) which are visually identified in the corresponding registered 2D image(s).

Since, as described herein before, the image sensor 204 and the depth sensor 206 of each associated pair are deployed to have a similar distance to the vehicle 202, the distance between the vehicle 202 and the depth sensor 206, which is computed based on the 3D image(s), is the same as the distance from the associated image sensor 204 to the vehicle 202. The distance from the associated image sensor 204 and the depth sensor 206 to each detected defect is therefore the same.

As shown at 112, the defect detection engine 230 may further analyze the 2D image(s) to compute, for example, derive, determine, and/or extract a size in pixels of one or more dimensions of each identified defect, for example, length, width, depth, diameter, border (line, and/or the like.

The defect detection engine 230 may compute the size in pixels of the defect's dimension(s) using one or more of the visual analysis tools, methods, and/or algorithms as known in the art, for example, computer vision, image processing, classification, and/or the like.

As shown at 114, the defect detection engine 230 may compute a real-world size of one or more of the dimensions of one or more of the detected defects. In particular, the defect detection engine 230 may compute the real-world size of the defect(s) dimension(s) based on their size in pixels and the distance between the image sensor 204 and the object. i.e., the defects detected in the exterior surface(s) of the vehicle 202.

To this end, the defect detection engine 230 may apply optics and/or geometry calculus and/or formulations. For example, as known in the art, the size in pixels of a defect's dimension may be translated to on-sensor size which may be expressed in one or more units, for example, in millimeters (mm), meters, and/or the like based on known parameters and/or characteristics of the image sensor 204, for example, a cell size, a cell density, a cell distribution and/or the like.

Based on optical geometry equations, the defect detection engine 230 may therefore compute the real-world size of the defect's dimension based on the on-sensor size of a defect's dimension (e.g., length, width, height, depth, etc.) imaged on the sensor and the distance of the image sensor 204 to the object, i.e., to the defect in the exterior surface of the vehicle 202.

Figure 4:
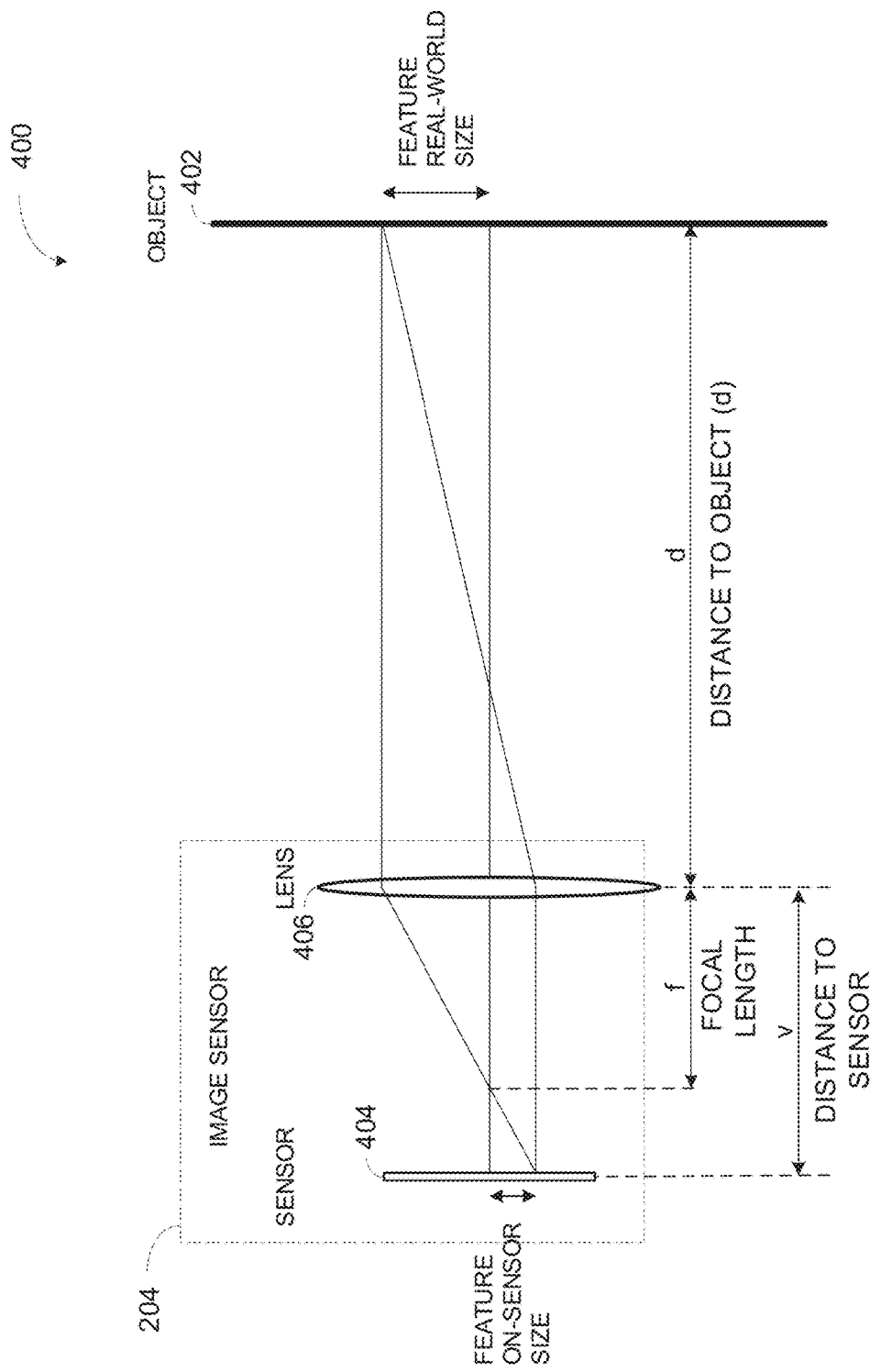
FIG. 4 is a schematic illustration demonstrating optics of an exemplary image sensor used for computing dimensions of defects detected in vehicles' exterior, according to some embodiments of the present invention.

Reference is now made to FIG. 4, which is a schematic illustration demonstrating optics of an exemplary image sensor used for computing dimensions of defects detected in vehicles' exterior, according to some embodiments of the present invention.

An exemplary object 402, for example, an exterior surface of a vehicle such as the vehicle 202, specifically a physical feature of the object 402, for example, a defect in the exterior surface may be located at a certain distance d from an image sensor such as the image sensor 204.

The image sensor 204 may comprise a sensor 404 and a lens 406 having a known focal length f. The sensor 404 and the lens 406 are distanced from each other by a known distance v where an image of the object 402 captured by the image sensor 404 is formed.

Based on geometry and optics the relation between the real-world size of the feature and the on sensor size of the feature may be expressed by the relation between the focal length f and the distance d as shown in equation 1 below. This relation is derived from the focal length f of the lens 406 as known in the art and is not described herein.

$$\frac{\text{feature on sensor size}}{\text{feature real world size}} = -\frac{v}{d} \qquad \text{Equation 1}$$

The real-world size of the feature, for example, the height of the feature may be therefore computed according to equation 2 below which is derived from equation 1. The (−) sign in equation 1 indicates that the image of the feature formed on the sensor 404 is inverted with respect to the real-world feature and the (−) sign may be therefore ignored.

$$\text{feature real world size} = \frac{\text{feature on sensor size} \times d}{f} \qquad \text{Equation 2}$$

A defect detection engine such as the defect detection engine 230 may compute the size in pixels of the feature's height based on analysis of the image(s) depicting the feature, for example, the defect, and translate the size in pixels to the on-sensor size of the defect (feature) according to the parameters and/or characteristics of the image sensor 204.

Using the computed on-sensor size of the feature and the distance between the image sensor 204 and the feature (object) which is extracted from one or more 3D images captured by a depth sensor such as the depth sensor 206 associated (paired) with the image sensor 204, the defect detection engine 230 may therefore compute the real-world size of the feature, for example, one or more dimensions (e.g., length, width, depth, height, etc.) of the defect in the exterior surface of the vehicle 202.

The defect detection engine 230 may provide, for example, output, transmit, distribute, and/or otherwise output defects data for the vehicle 202 which comprises real-world sizes of the dimension(s) of the defects detected in the exterior of the vehicle 202. For example, the defect detection engine 230 may transmit the defects data via the network 212, store the defects data in one or more records, databases and/or the like.

In particular, the defect detection engine 230 may deliver the defects data for use by one or more applications adapted to analyze the defects data and optionally take one or more actions accordingly. For example, a certain defects analysis application may be adapted to analyze the defects data to assess and/or evaluate a wear and tear condition of the vehicle 202. The application may be further adopted to estimate a cost of repairing the detected defects based on their severity and a cost of labor, materials, parts, repair effort, repair equipment, and/or the like. In another example, a certain application may be adapted to estimate, based on analysis of the defects data, a devaluation of the vehicle 202 due to its exterior defects.

According to some embodiments of the present disclosure, there are provided methods, systems, and computer program products for estimating defects in the exterior of vehicles 202 and their dimensions based on known dimensions of one or more reference features identified in images depicting the vehicles 202. In particular, the real-world size of the defects' dimensions may be computed based on known real-world dimension values of the reference features.

Figure 5:
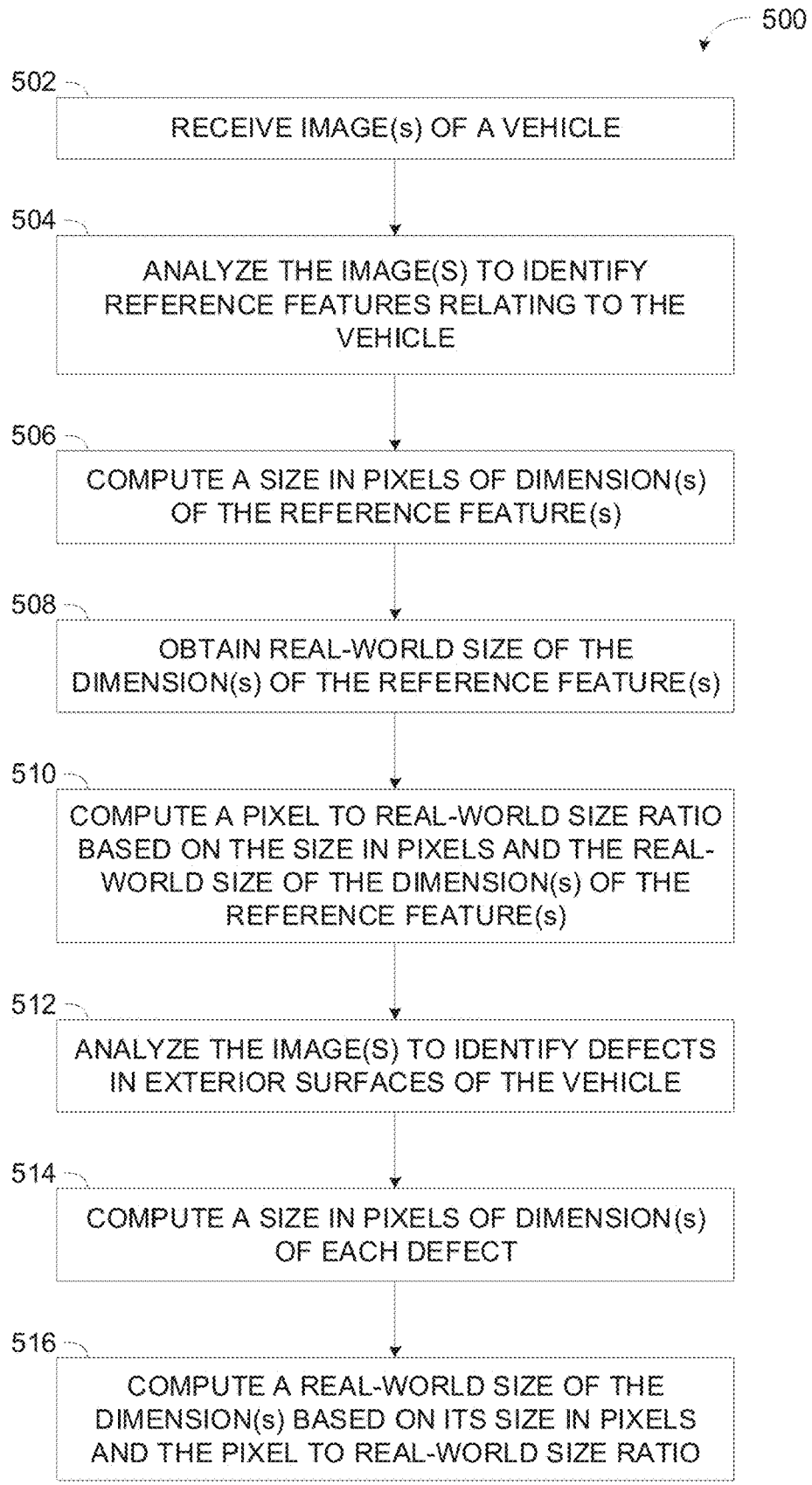
FIG. 5 is a flowchart of an exemplary process of estimating dimensions of defects detected in vehicles' exterior based on known dimensions of reference features of the vehicles, according to some embodiments of the present invention.

Reference is now made to FIG. 5, which is a flowchart of an exemplary process of estimating dimensions of defects detected in vehicles' exterior based on known dimensions of reference features of the vehicles, according to some embodiments of the present invention.

Figure 6:
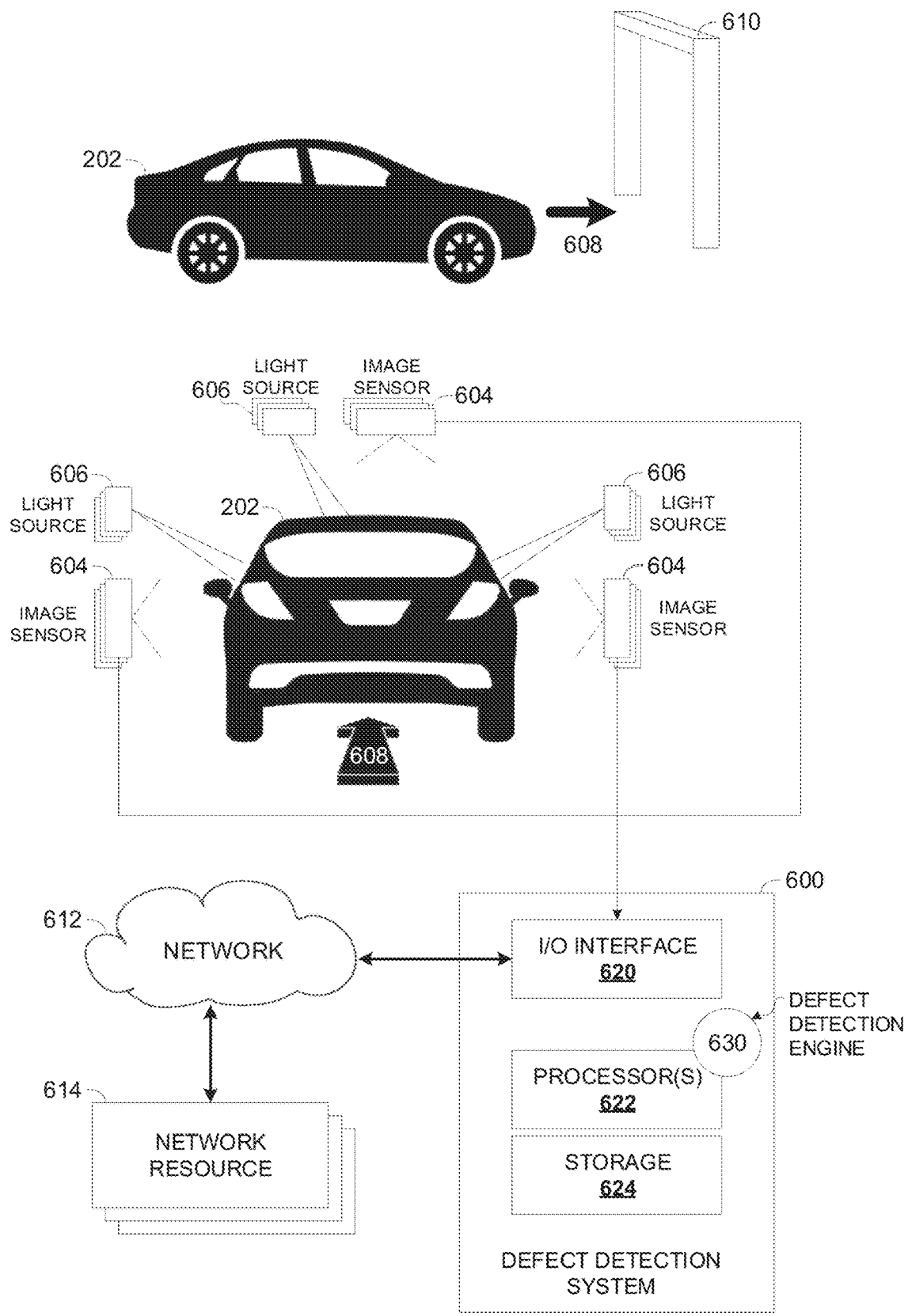
FIG. 6 is a schematic illustration of an exemplary system for estimating dimensions of defects detected in vehicles' exterior based on known dimensions of reference features relating to the vehicles, according to some embodiments of the present invention.

Reference is also made to FIG. 6, which is a schematic illustration of an exemplary system for estimating dimensions of defects detected in vehicles' exterior based on known dimensions of reference features relating to the vehicles, according to some embodiments of the present invention.

An exemplary process 500 may be executed, for example, by an exemplary defect detection system 600 to estimate dimensions of defects detected in exterior surfaces of one or more vehicles such as the vehicle 202, specifically side, top, front and/or rear exterior surfaces, for example, a door, a window, a front fender, a back fender, a roof, an engine hood, a trunk lid, a windshield, and/or the like. In particular, the defects' dimensions may be estimated based on visual inspection of the vehicle's exterior.

One or more image sensors 604 such as the image sensor 204 may be deployed to capture one or more images of the vehicle 202 while passing in front of the image sensors 604. Specifically, the image sensor(s) 604 may be deployed to capture images of the exterior surfaces of the passing vehicle 202. As such, the image sensor(s) 604 may be deployed to monitor a right side, a left side, and/or a top side of the vehicle 202.

Typically, the image sensor(s) 604 may be statically deployed in fixed location(s) such that the vehicles 202 may be driven in front of the image sensor(s) 604.

Moreover, each image sensor 604 may be deployed such that its lens plane is substantially parallel to the exterior surfaces of the passing vehicle 202. For example, a first image sensor 604 deployed to capture images of the right side of the passing vehicle 202 may be deployed such that its lens plane is parallel to the right side exterior of the passing vehicle 202. In another example, a second image sensor 604 deployed to capture images of the left side of the passing vehicle 202 may be deployed such that its lens plane is parallel to the right side exterior of the passing vehicle 202. In another example, a third image sensor 604 deployed to capture images of the top side of the passing vehicle 202 may be deployed such that its lens plane is parallel to the top exterior of the passing vehicle 202.

Moreover, as described herein before for the defect detection system 200, the image sensor(s) 604 may be deployed along a predefined passage track 608 defined for the passing vehicle 202 to follow. In particular, the image sensor(s) 604 may be deployed such that the lens plane of each image sensor 604 may be parallel to the predefined passage track 608.

Optionally, the image sensor(s) 604 may be deployed to effectively capture images of the exterior surfaces at multiple sides of the vehicle 202 during a single pass of the vehicle 202 following the passage track 608, for example, exterior surfaces of the right side, the left side, and/or the top side of the passing vehicle 202. To this end, these image sensors 604 may be installed to the right, to the left, and/or above the passing vehicle 202 such that the lens plane of each image sensor 204 may be parallel to the predefined passage track 608 according to the relative position of each image sensor 604. Since the vehicle 202 may be scanned while passing in front of the sensors along the passage track 608, a reduced number of image sensors 604 may be used to effectively scan the passing vehicle 202.

Optionally, the image sensor(s) 604 may be arranged, mounted, coupled, and/or otherwise installed in a scanning structure 610 such as the scanning structure 210 through which the passing vehicle 202 may pass according to a predefined passage track 608 and be scanned by the image sensor(s) 604 from multiple sides simultaneously, for example, right, left, and top sides. As stated herein before, the term simultaneously as used herein does not necessarily indicate that multiple images sensors 204 around the vehicle 202 capture images of the vehicle 202 at the exact same time, but rather at the same phase or time period while the vehicle 202 is located and/or passing in front of the image sensors 204.

Optionally, one or more light sources 606, for example, alight emitting device, a lamp, a LED, an infrared (IR) light emitter, a laser emitter, and/or the like may be deployed to project one or more light patterns on the vehicle 202, specifically on one or more exterior surfaces of the vehicle 202. In particular, the light source(s) 606 may be configured, adapted, and/or operated to project one or more patterns which may be visibly detectable in the images captured by the image sensor(s) 604.

Moreover, the light source(s) 606 may be deployed and/to adapted to project one or more patterns detectable by image sensor(s) 604 scanning the vehicle 202 from multiple sides simultaneously during a single pass of the vehicle 202 through the predefined passage track 608. For example, one or more light sources 606 may be deployed along the predefined passage track 608 such that one or more light patterns projected by the light source(s) 606 may be identified in images captured by image sensor(s) 604 simultaneously scanning the vehicle 202 from a right side, a left side, and/or a top side.

The defect detection system 600, for example, a server, a computer, a computing node, a cluster of computing nodes and/or the like may include an I/O interface 620 such as the I/O interface 220, a processor(s) 622 such as the processor(s) 222, and a storage 624 such as the storage 224 for storing data and/or program code (program store).

Via the I/O interface 620, the defect detection system 600 may communicate with one or more of the image sensors 604 to receive the images of the exterior surfaces of the vehicle 202 captured by the image sensor(s) 604. Moreover, in case light source(s) 606 are deployed to project light patterns on the vehicle 202, the defect detection system 600 may communicate with the light source(s) 606 via the I/O interface 620.

The I/O interface 620 may optionally include one or more wired and/or wireless network interfaces, ports, and/or links, utilized by hardware, software, and/or combination thereof, for connecting to a network 612 such as the network 212 through which the defect detection system 600 may communicate with one or more remote network resources 612 such as the network resource 212. In another example, assuming one or more of the image sensor(s) 604 and/or the light source(s) 606 support wired and/or wireless network connectivity and connect to one or more networks of the network 612, the defect detection system 600 may communicate with such image sensor(s) 604 and/or light source(s) 606 via the network 612.

As described for the processor(s) 222, the processor(s) 622 may execute one or more functional modules utilized by one or more software modules stored in the storage 624, one or more hardware modules available and/or utilized in the defect detection system 600, and/or a combination thereof. For example, the processor(s) 622 may execute a defect detection engine 630 functional module adapted for executing the process 500 to detect defects in vehicle's exterior and estimate their dimensions.

Optionally, the defect detection system 600, specifically, the defect detection engine 630 may be utilized by one or more cloud computing services, platforms and/or infrastructures such as, for example, IaaS, PaaS, SaaS and/or the like provided by one or more vendors, for example, GCP, Microsoft Azure, AWS and EC2, IBM Cloud, and/or the like.

For brevity, the process 500 is described for detecting defects and estimating their dimensions in a single vehicle 202. This, however, should not be construed as limiting since as may become apparent to a person skilled in the art, the process 500 may be easily, repeated, duplicated, and/or scaled for detecting defects and estimating their dimensions in a plurality of vehicles 202.

As shown at 502, the process 500 starts with the defect detection engine 630 receiving one or more images of the vehicle 202 captured by one or more image sensors 604 while the vehicle 202 is located and/or passes in front of the image sensor(s) 204.

The received image(s) may comprise 2D images which visualize the vehicle 202, in particular the exterior surface(s) of the vehicle 202.

As shown at 504, the defect detection engine 630 may analyze the image(s) comprising to identify one or more reference features relating to the vehicle 202.

One or more of the reference feature(s) may include and/or relate to one or more physical reference features, for example, physical features and/or elements of the vehicle 202 such as, for example, a wheel, a door, a window, a windshield, a fender, a roof, an engine hood, a trunk lid, and/or the like having one or more known dimension values, for example, a length, a width, a height, a diameter, and/or the like. In another example, the physical reference features may include one or more features of one or more elements which are not essentially part of the vehicle 202 but are rather connected, attached, and/or otherwise coupled to the vehicle 202, for example, a sticker, a mechanical element, and/or the like.

In particular, the selected reference features may comprise such features of the vehicle 202 which are clearly visible and identifiable in the image(s).

For example, the physical reference feature(s) may comprise one or more wheel features, for example, a rim size (e.g., diameter) of one or more wheels of the vehicle 202, a tire aspect ratio (profile) of a tire of the vehicle 202, and/or the like. In another example, the physical reference feature(s) may comprise one or more dimensions of one or more other elements of the vehicle 202, for example, a length of an engine hood, a height of a front window (e.g., driver or passenger side window), a length of a side mirror, a width of a door handle, and/or the like.

In another example, one or more of the reference feature(s) may include one or more projected reference features, i.e., features of one or more (light) patterns projected on the vehicle 202 by one or more of the light sources 606. The pattern(s) projected by the light source(s) 606 may include one or more projected features which may be clearly visible in images of the vehicle 202 captured by the image sensor(s) 604 in order to support accurate and reliable computation, derivation, and/or determination of dimensions of the projected features. Such patterns may include, for example, geometrical patterns having geometrical features, for example, strips, bars, shapes, and/or the like having easily identifiable and distinguishable borders, and/or outline which may be used to compute their dimensions.

The light source(s) 606 may be configured to project the pattern(s) according to one or more operation modes. For example, in one exemplary operation mode, one or more of the light source(s) 606 may constantly (continuously) project pattern(s) once the defect detection system 600 and/or the light source(s) 606 are turned ON. In another exemplary operation mode, one or more of the light source(s) 606 may be triggered to project pattern(s) upon detection of vehicle 202 approaching the scanning structure 610, for example, by a proximity sensor, and/or the like. In another exemplary operation mode, one or more of the light source(s) 606 may be operated to project pattern(s) by one or more control systems, for example, the defect detection system 600, specifically by the defect detection engine 630.

As shown at 506, the defect detection engine 630 may compute, for example, derive, extract, and/or determine a size in pixels of one or more of the reference features identified in the image(s). As described in step 112 of the process 100, the defect detection engine 630 may apply one or more visual analysis tools, methods, and/or algorithms as known in the art, for example, computer vision, image processing, classification, and/or the like to compute the size in pixels of the reference feature(s).

As shown at 508, the defect detection engine 630 may obtain a real-world size of one or more reference features identified in the image(s).

The defect detection engine 630 may apply one or more methods, and/or techniques to obtain the real-world size of the reference feature(s).

For example, assuming the reference feature(s) identified in the image(s) comprise one or more physical features of the vehicle 202, for example, wheel feature(s) relating to one or more wheels of the vehicle 202, for example, wheel rim size, and/or tire aspect ratio (profile). In such case, the defect detection engine 630 may analyze one or more images captured by the image sensor(s) 604 which depict one or more wheels of the vehicle 202 and/or part thereof to identify markings on one or more tires of the vehicle 202 which state the real-world size of one or more of the wheel features, for the wheel rim size, the tire aspect ratio, and/or the like. The defect detection engine 630 may apply one or more visual analysis and/or text recognition tools, methods, and/or algorithms, for example, Optical Character Reader (OCR) to identify the tire dimension markings marked on the tires of the vehicle 202. As such, based on the identified markings, the defect detection engine 630 may determine and/or derive the real-world size of the wheel feature(s), for example, the rim size, the tire aspect ratio, and/or the like.

Figure 7:
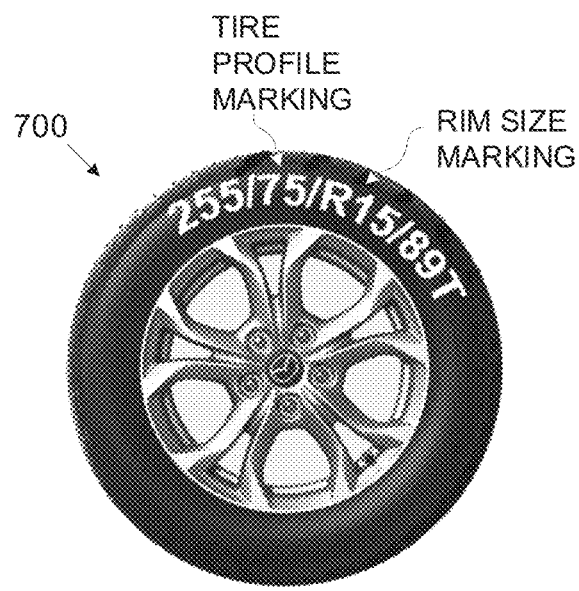
FIG. 7 is a schematic illustration of an exemplary vehicle wheel and tire with tire markings indicative of dimensions of the tire.
Figure 7:
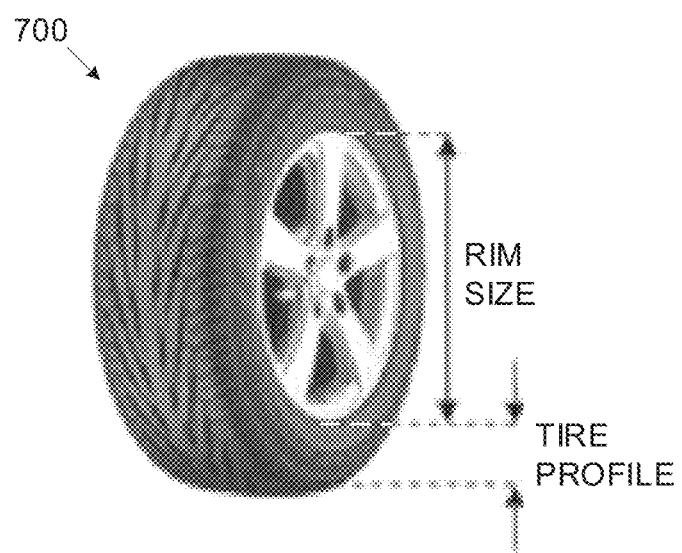

Reference is now made to FIG. 7, which is a schematic illustration of an exemplary vehicle wheel and tire with tire markings indicative of dimensions of the tire. An exemplary tire 700 of a vehicle such as the vehicle 202, for example, a private car, may be marked with markings expressing dimensions of one or more wheel features of the wheel 700, for example, a rim size marking, a tire profile marking and/or the like. As seen, the rim size marking, for example R15, may express the size, specifically the diameter of the rim of the wheel 700 while the tire profile marking, for example, 75, may express the profile, of the tire of the wheel 700.

Reference is made once again to FIG. 1.

In another example, the defect detection engine 630 may obtain the real-world size of one or more reference features from one or more databases, for example, a database, a file, a list, a table, and/or the like. For example, the defect detection engine 630 may access one or more databases to fetch the real-world size of one or more reference features of one or more physical elements of the vehicle 202, for example, a door, a window, a fender, a roof, an engine hood, a trunk lid, a windshield, and/or the like.

The database(s) may comprise one or more local databases stored locally at the defect detection system 600, for example, in the storage 624. In another example, database(s) may comprise one or more remote databases accessible to the defect detection engine 630 via the network 612.

Typically, data relating to the reference features may be stored and arranged in the database(s) according to models of vehicles 202 such that the data, for example, the real-world size of one or more reference features of each vehicle 202 may be found in the database according to the model of the respective vehicle 202.

The defect detection engine 630 may therefore access the database(s) and obtain the real-world size of the selected reference feature(s) identified in the image(s) of the vehicle 202 according to a model of the vehicle 202.

To this end the defect detection engine 630 may first determine the model of the vehicle 202. For example, the defect detection engine 630 may analyze one or more images of the vehicle 202, using one or more of the visual and/or text recognition algorithms, to identify markings indicative of the model of the vehicle 202, for example, a model identifier marked on a rear side of the vehicle 202, a maker (manufacturer) of the vehicle 202, and/or the like. In another example, using the visual analysis algorithm(s), the defect detection engine 630 may identify one or more features unique to specific vehicle models, for example, a unique outline of one or more elements of the vehicle 202 (e.g., engine hood, windshield, fender, side skirt, etc.), a unique structure and/or texture of one or more elements of the vehicle 202 (e.g., front grill, etc.), and/or the like.

After determining the model of the vehicle 202, optionally coupled with a year of manufacture, the defect detection engine 630 may use the model type of the vehicle to fetch the real-world size of the selected reference feature(s) from the database(s).

In another example, assuming the reference feature(s) identified in the image(s) comprise one or more projected reference features, i.e., features of one or more (light) patterns projected on the vehicle 202 by one or more of the light source(s) 606. In such case, the defect detection engine 630 may apply one or more methods for computing, deriving, and/or otherwise determining the real-world size of the projected reference feature(s).

For example, the defect detection engine 630 may determine the real-world size of one or more projected reference features based on calibration correlating size in pixels to real-world size. During calibration of the light source(s) 606 and its projected pattern(s), specifically calibration of the light source(s) 606 with respect to the image sensor(s) 604, the real-world size of one or more projected calibration feature may be measured on a target surface while the light source(s) 606 projects pattern(s) on the target surface. Based on optics computations as known in the art, the defect detection engine 630 may compute, and/or determine a ratio, and/or magnification rate between the on-sensor size of the projected calibration feature(s) at the image sensor(s) 604 and the real-world size of the projected calibration feature(s) measured during calibration.

The defect detection engine 630 may thus compute the real-world size of the projected reference feature(s) based on the ratio, and/or magnification rate of the image sensor(s) 604 determined during calibration of the image sensor(s) 604 which may be done offline, for example, prior to operating the defect detection system 600, periodically after deployment of the defect detection system 600, and/or the like.

In another example, the defect detection engine 630 may determine the real-world size of one or more projected reference features based on mapping of the real-world size of the projected reference features to their size in pixels over a plurality of distances measured empirically (tested), typically offline. For example, assuming the projected reference feature(s) includes a stripe of a stripes pattern projected by the light source(s) 606. In such case, the real-world size of the projected stripe may be measured on a target surface placed at a plurality of distances from the light source(s) 606 and logged in one or more records, for example, a file, a list, a table, a databased, and/or the like in association with the size in pixels of the stripe at each distance and optionally also with the corresponding distances.

In real-time, the defect detection engine 630 may fetch, from the mapping record, the real-world size of the projected reference feature(s), for example, the stripe, associated with the size in pixels of the stripe identified in the image captured by the image sensor(s) 604.

In another example, the defect detection engine 630 may determine the real-world size of one or more projected reference features based on one or more operational parameters of one or more of the image sensor(s) 604, for example, a magnification, a zoom, a scale, and/or the like. Such operational parameters may express a magnification value of objects at the image sensor(s) 604 thus allowing translation of on-sensor size of captured objects, which may be translated to their size in pixels, to the real-world size of the objects.

In such case, the defect detection engine 630 may compute the real-world size of the projected reference feature(s) by translating their on-sensor size and size in pixels to their respective real-world size according to the operational parameter(s) of the image sensor(s) 604.

Figure 8:
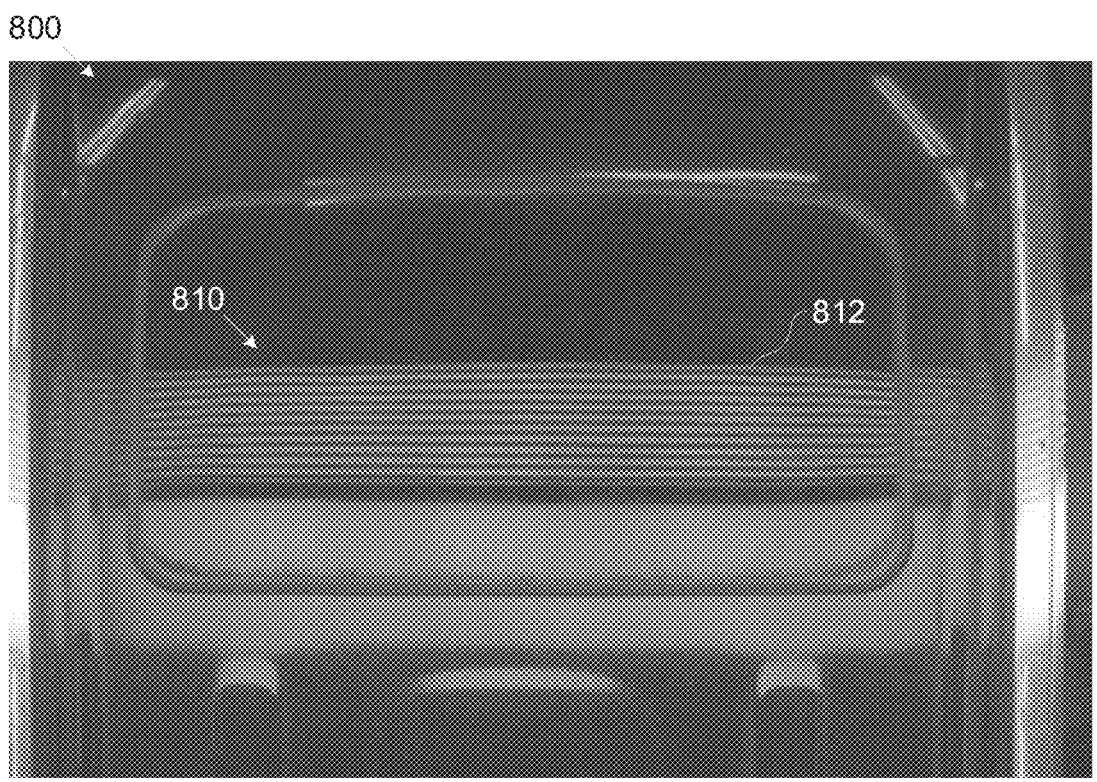
FIG. 8 is a schematic illustration of an exemplary pattern projected on a vehicle for estimating dimensions of defects detected in the vehicle's exterior based on known dimensions of projected reference features of the pattern, according to some embodiments of the present invention.

Reference is now made to FIG. 8 which is a schematic illustration of an exemplary pattern projected on a vehicle for estimating dimensions of defects detected in the vehicle's exterior based on known dimensions of projected reference features of the pattern, according to some embodiments of the present invention.

An exemplary pattern 810 may be projected by a light source such as the light source 606 on an exemplary surface 800 of a vehicle such as the vehicle 202. The projected pattern 810 may include a plurality of projected features, for example, stripes 812 which may be used as reference features for estimating size of defects detected in the exterior surface of the vehicle 202. For example, a width of the projected reference feature 812 may be used for deriving a ratio between size in pixels to real-world size based on the size in pixels determined for the projected reference feature 812 and its real-world size determine using one or more methods as described herein before.

As shown at 510, the defect detection engine 630 may compute a pixel to real-world size ratio for each of the image sensors 604 used to capture images of the vehicle 202 based on the real-world size of the reference feature(s).

The defect detection engine 630 may compute a pixel to real-world size ratio based on the real-world size of one or more of the reference features and the size in pixels of the respective reference feature as determined in one or more images captured by the respective image sensor 604. In particular, based on the size in pixels and the real-world size of the reference feature(s), the size (e.g., width, height) of each pixel in the image(s) captured by the respective image sensor 604 may be translated to a real-world size value which may be expressed in one or more units, for example, millimeters, centimeters, meters, and/or the like.

Optionally, the defect detection engine 630 may adjust the pixel to real-world size ratio according to one or more operational parameters of one or more of the image sensors 604, for example, a bias, a cell size, and/or the like which may affect the on-sensor size computed for one or more of the reference features.

As shown at 512, the defect detection engine 630 may analyze one or more image(s) of the vehicle 202 captured by the image sensor(s) 604 to identify one or more defects in the exterior surface(s) of the vehicle 202, for example, a dent, a bent, a hole, a tear, a scratch, a de-coloration, and/or the like.

As described herein before, a plurality of image sensors 604 may be deployed around the vehicle 202 to simultaneously capture images of multiple sides of the vehicle 202, for example, right side, left side, and/or top side during a time period while the vehicle is located and/or passing in front of the sensors. Analyzing images depicting multiple sides of the vehicle 202, the defect detection engine 630 may therefore identify defects in exterior surfaces on multiple sides of the vehicle 202 during a single pass of the vehicle 202 in front of the sensors, for example, a single pass along the passage track 608.

As shown at 514, the defect detection engine 630 may compute a size in pixels of one or more dimension of each identified defect, for example, length, width, depth, height, diameter, border, outline, and/or the like. The defect detection engine 630 may compute the size in pixels of the defect's dimensions using one or more of the visual analysis tools as described in step 112 of the process 100.

As shown at 516, based on the size in pixels of a respective dimension of a respective defect identified in the image(s) and the computed pixel to real-world size ratio, the defect detection engine 630 may compute the real-world size of the respective dimension of the respective defect. For example, the defect detection engine 630 may compute the real-world size of the respective dimension by multiplying the size in pixels of a respective dimension by the real-world size value represented by each pixel.

Optionally, the defect detection engine 630 may compute the real-world size of one or more dimensions of one or more defects identified in the image(s) based on a distance between each image sensor 604 which captured the respective image(s). In such case, the defect detection engine 630 may first compute the distance d between the image sensor 604 and the vehicle 202. The defect detection engine 630 may apply one or more methods and/or formulations to compute the distance d to the feature, i.e., the distance between the image sensor 204, specifically the lens 406 and the object (feature) 402.

For example, with reference to FIG. 4, as known in the art, the relation between the focal length f of lens 406, the distance d between the lens 406 and the object 402, and the distance v between the lens 406 to the image of the object 402 is expressed by equation 3 below.

$$\frac{1}{f} = \frac{1}{v} + \frac{1}{d} \qquad \text{Equation 3}$$

The distance d from the image sensor 204 to the object 402 may be therefore computed according to equation 4 below which is derived from equation 3 since the focal length f of lens 406 and the distance v are known.

$$d = \frac{v \times f}{v - f} \qquad \text{Equation 4}$$

In another example, the defect detection engine 630 may compute the distance d of the image sensor(s) 604 to one or more of the reference features identified in the image(s) based on their known real-world size and their size in pixels in the image(s). In particular, the defect detection engine 630 may translate the size in pixels of the reference feature(s) to their respective on-sensor size (feature on-sensor size) expressed in one or more units (e.g., mm, cm, meter, etc.) based on known parameters and/or characteristics of the image sensor 604, for example, cell size, cell density, cell distribution and/or the like.

Based on the on-sensor size of the reference feature(s), the defect detection engine 630 may compute the distance d according to equation 5 below which is derived from equation 1.

$$d = \frac{\text{feature real world size} \times f}{\text{feature on sensor size}} \qquad \text{Equation 5}$$

The defect detection engine 630 may then compute the real-world size of the dimension(s) of the defect(s) identified in the image(s) captured by a respective image sensor 604 based on the distance computed between the respective image sensor 604 and the one or more of the reference feature(s) identified in the image(s) captured by a respective image sensor 604 according to equation 2 above.

Optionally, the defect detection engine 630 may adjust the pixel to real-world size ratio according to one or more deviations of the vehicle 202 from the predefined passage track 608.

Since the image sensor(s) 604 are deployed such that their lens plane is substantially parallel to the predefined passage track 608, in case the vehicle 202 deviates from the passage track 608, the distance between one or more of the image sensor(s) 604 may change. Obviously such deviations of the vehicle 202 from the passage track 608, for example, a deviation to the right, a deviation to the left, and/or the like may affect the distance between the image sensor(s) 604 and the vehicle 202 which in turn may reduce accuracy of the computed pixel to real-world size ratio.

The defect detection engine 630 may be therefore adapted to adjust the pixel to real-world size ratio according to such deviations to compensate for the deviations and increase accuracy of the computed pixel to real-world size ratio.

The defect detection engine 630 may detect and/or identify such deviations from the passage track 608 based on analysis one or more of the reference features identified in a plurality of images captured by a plurality of image sensors 604 distributed along the predefined passage track 608. For example, the defect detection engine 630 may identify that while multiple image sensors 604 are deployed at the same distance from the passage track 608, the actual distance between one or more of these image sensors 604 and the vehicle 202 is not the same as the distance between one or more of the other image sensors 604.

Based on the detected deviation(s), the defect detection engine 630 may adjust the pixel to real-world size ratio accordingly. For example, assuming the defect detection engine 630 identifies that the vehicle 202 deviates to the right, the defect detection engine 630 may adjust, specifically reduce the pixel to real-world size ratio computed for one or more image sensors 604 deployed to scan the right of the vehicle 202. In such case of deviation to the right, the defect detection engine 630 may also adjust, specifically increase the pixel to real-world size ratio computed for one or more image sensors 604 deployed to scan the left of the vehicle 202. In another example, assuming it detects a deviation to the left of the vehicle 202, the defect detection engine 630 may adjust, specifically reduce the pixel to real-world size ratio computed for one or more image sensors 604 deployed to scan the left of the vehicle 202 and/or increase the pixel to real-world size ratio computed for one or more image sensors 604 deployed to scan the right side of the vehicle 202.

Figure 9:
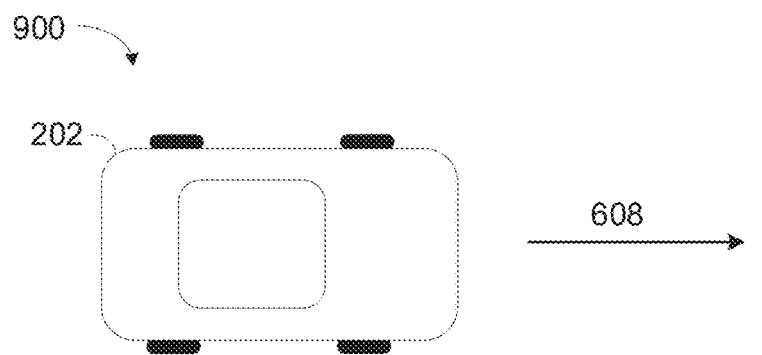
FIG. 9 is a schematic illustration of exemplary deviations of a vehicle from a predefined passage track defined for estimating dimensions of defects detected in the vehicle's exterior based on known dimensions of reference features relating to the vehicle, according to some embodiments of the present invention.
Figure 9:
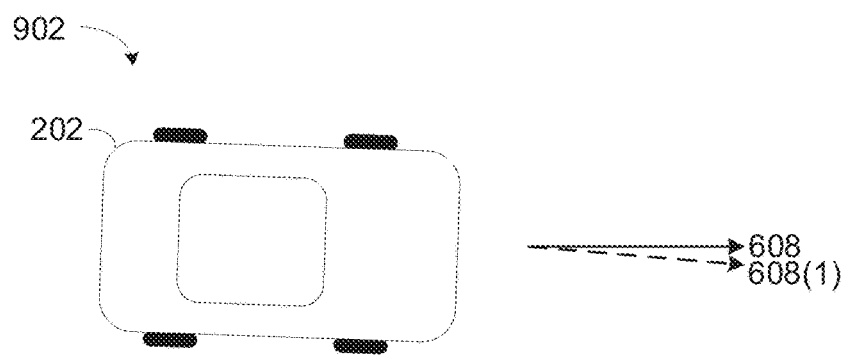
Figure 9:
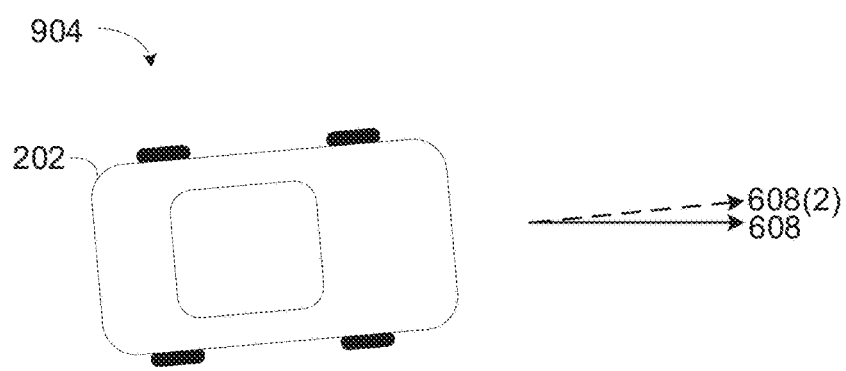

Reference is now made to FIG. 9, which is a schematic illustration of exemplary deviations of a vehicle from a predefined passage track defined for estimating dimensions of defects detected in the vehicle's exterior based on known dimensions of reference features relating to the vehicle, according to some embodiments of the present invention.

As seen in illustration 900, a vehicle such as the vehicle 202 may be operated to follow a predefined passage track such as the predefined passage track 608 during which the vehicle 202 may be scanned by one or more image sensors such as the image sensor 604 to identify defects in exterior surfaces of the vehicle 202 and estimate the defects' dimensions.

As seen in illustration 902, the vehicle 202 may deviate to the right from the passage track 608 such that it in practice follows an altered passage track 608(1) thus potentially altering the distance between the vehicle 202 and one or more image sensors 604 deployed to capture images of the vehicle 202. In another example, as seen in illustration 904, the vehicle 202 may deviate from the passage track 608 to the left such that it in practice follows an altered passage track 608(2) thus potentially altering the distance between the vehicle 202 and one or more of the image sensors 604.

The defect detection engine 630 may provide, for example, output, transmit, distribute, and/or otherwise output defects data for the vehicle 202 which comprises real-world sizes of the dimension(s) of the defects detected in the exterior of the vehicle 202. For example, the defect detection engine 630 may transmit the defects data via the network 612, store the defects data in one or more records, databases and/or the like.

For example, the defect detection engine 630 may provide the defects data to one or more applications adapted to analyze the defects data and optionally take one or more actions accordingly.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms image sensor, depth sensor, image registration, and visual analysis are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of estimating dimensions of a vehicle's exterior defects based on reference dimensions, comprising: using at least one processor for:
    analyzing at least one image captured by at least one image sensor deployed to depict at least one vehicle to identify at least one reference feature relating to the at least one vehicle;
    obtaining a real-world size of the at least one reference feature;
    computing a pixel to real-world size ratio for the at least one image sensor based on the real-world size of the at least one reference feature and a size in pixels of the at least one reference feature in the at least one image;
    analyzing at least one image captured by the at least one image sensor to identify at least one defect in an exterior of the at least one vehicle;
    computing a size in pixels of at least one dimension of the at least one defect; and
  computing a real-world size of the at least one dimension based on the size in pixels of the at least one dimension and the pixel to real-world size ratio;
    wherein the at least one reference feature comprises at least one physical reference feature of the at least one vehicle;
    wherein the at least one physical reference comprises at least one wheel feature of at least one of the wheels of the at least one vehicle, the at least one wheel feature is a member of a group consisting of: a wheel rim size (diameter), and a tire aspect ratio (profile);
    wherein the real-world size of the at least one wheel feature is determined according to tire dimensions marked on at least one tire of the at least one vehicle, the marked tire dimensions are identified by analyzing at least one image depicting at least one of the tires of the at least one vehicle.

2. The method of claim 1, wherein the at least one defect is a member of a group consisting of: a dent, a bent, a hole, a tear, a scratch, and a de-coloration.

3. The method of claim 1, wherein the at least one dimension of the at least one defect is a member of a group consisting of: length, width, depth, height, and diameter.

4. The method of claim 1, wherein the real-world size of the at least one physical reference feature is obtained from at least one database according to a model of the at least one vehicle.

5. The method of claim 4, wherein the model of the at least one vehicle is identified based on a model identifier detected in the at least one image.

6. The method of claim 1, wherein the at least one reference feature comprises at least one projected reference feature of at least one reference pattern projected on the at least one vehicle by at least one light source.

7. The method of claim 6, wherein the real-world size of the at least one projected reference feature is derived from at least one of: calibration of the at least one light source with respect to the at least one image sensor, empiric mapping of size in pixels of the at least one projected reference feature to corresponding real-world sizes of the at least one projected reference feature at a plurality of distances, and at least one operational parameter of the at least one image sensor.

8. The method of claim 1, wherein the at least one image sensor is deployed along a predefined passage track defined for the at least one vehicle to follow such that the lens plane of the at least one image sensor is parallel to the predefined passage track.

9. A method of estimating dimensions of a vehicle's exterior defects based on reference dimensions, comprising: using at least one processor for:
    analyzing at least one image captured by at least one image sensor deployed to depict at least one vehicle to identify at least one reference feature relating to the at least one vehicle;
    obtaining a real-world size of the at least one reference feature;
    computing a pixel to real-world size ratio for the at least one image sensor based on the real-world size of the at least one reference feature and a size in pixels of the at least one reference feature in the at least one image;
    analyzing at least one image captured by the at least one image sensor to identify at least one defect in an exterior of the at least one vehicle;
    computing a size in pixels of at least one dimension of the at least one defect; and
    computing a real-world size of the at least one dimension based on the size in pixels of the at least one dimension and the pixel to real-world size ratio;
    wherein the real-world size of the at least one dimension of the at least one defect is computed based on a distance between the at least one image sensor and the at least one vehicle, the distance is derived from the real-world size of the at least one reference feature and the size in pixels of the at least one reference feature in the at least one image.

10. The method of claim 9, wherein the at least one reference feature comprises at least one physical reference feature of the at least one vehicle.

11. The method of claim 9, wherein the at least one physical reference comprises at least one wheel feature of at least one of the wheels of the at least one vehicle, the at least one wheel feature is a member of a group consisting of: a wheel rim size (diameter), and a tire aspect ratio (profile).

12. The method of claim 9, further comprising receiving a plurality of images captured by a plurality of image sensors deployed to depict a right side, a left side, and a top side of the at least one vehicle such that the right side, the left side, and the top side are scanned simultaneously.

13. The method of claim 9, further comprising adjusting the pixel to real-world size ratio according to at least one operational parameter of the at least one image sensor.

14. A method of estimating dimensions of a vehicle's exterior defects based on reference dimensions, comprising: using at least one processor for:
- analyzing at least one image captured by at least one image sensor deployed to depict at least one vehicle to identify at least one reference feature relating to the at least one vehicle;
- obtaining a real-world size of the at least one reference feature;
- computing a pixel to real-world size ratio for the at least one image sensor based on the real-world size of the at least one reference feature and a size in pixels of the at least one reference feature in the at least one image;
- analyzing at least one image captured by the at least one image sensor to identify at least one defect in an exterior of the at least one vehicle;
- computing a size in pixels of at least one dimension of the at least one defect; and
  - computing a real-world size of the at least one dimension based on the size in pixels of the at least one dimension and the pixel to real-world size ratio;
- adjusting the pixel to real-world size ratio according to deviation of the at least one vehicle from a predefined passage track;
- wherein the at least one image sensor is deployed along the predefined passage track defined for the at least one vehicle to follow such that the lens plane of the at least one image sensor is parallel to the predefined passage track.

15. The method of claim 14, wherein the deviation is detected based on analysis of the at least one reference feature identified in a plurality of images captured by a plurality of image sensors distributed along the predefined passage track.

16. A system for estimating dimensions of a vehicle's exterior defects based on reference dimensions, comprising:
- at least one processor configured to execute a code, the code comprising:
  - code instructions to analyze at least one image captured by at least one image sensor deployed to depict at least one vehicle to identify at least one reference feature relating to the at least one vehicle;
  - code instructions to obtain a real-world size of the at least one reference feature;
  - code instructions to compute a pixel to real-world size ratio for the at least one image sensor based on the real-world size of the at least one reference feature and a size in pixels of the at least one reference feature in the at least one image;
  - code instructions to analyze at least one image captured by the at least one image sensor to identify at least one defect in an exterior of the at least one vehicle;
  - code instructions to compute a size in pixels of at least one dimension of the at least one defect; and
  - code instructions to compute a real-world size of the at least one dimension based on the size in pixels of the at least one dimension and the pixel to real-world size ratio;
  - wherein the real-world size of the at least one dimension of the at least one defect is computed based on a distance between the at least one image sensor and the at least one vehicle, the distance is derived from the real-world size of the at least one reference feature and the size in pixels of the at least one reference feature in the at least one image.

* * * * *